United States Patent
Lavoie

(10) Patent No.: US 8,290,657 B2
(45) Date of Patent: Oct. 16, 2012

(54) DIRECTION DETERMINATION FOR ACTIVE PARK ASSIST

(75) Inventor: Erick Michael Lavoie, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 13/080,901

(22) Filed: Apr. 6, 2011

(65) Prior Publication Data

US 2011/0184603 A1    Jul. 28, 2011

(51) Int. Cl.
*B60L 9/00* (2006.01)
(52) U.S. Cl. ......................................................... 701/22
(58) Field of Classification Search .......................... None
See application file for complete search history.

(56) References Cited

U.S. PATENT DOCUMENTS

| | | | |
|---|---|---|---|
| 6,736,753 B2 | 5/2004 | Endo | |
| 2004/0200654 A1* | 10/2004 | Hatsuda et al. | 180/243 |
| 2006/0047400 A1 | 3/2006 | Prakash | |
| 2008/0294342 A1* | 11/2008 | Hoshizaki et al. | 701/216 |
| 2009/0042691 A1 | 2/2009 | Matsubara | |
| 2009/0157260 A1* | 6/2009 | Lee | 701/41 |
| 2009/0287375 A1 | 11/2009 | Lavoie | |
| 2010/0039292 A1* | 2/2010 | Scherl et al. | 340/932.2 |
| 2010/0168967 A1 | 7/2010 | Dlugoss | |
| 2011/0087399 A1* | 4/2011 | Hyde et al. | 701/32 |
| 2011/0095910 A1* | 4/2011 | Takano | 340/932.2 |
| 2011/0156928 A1* | 6/2011 | Ghisio et al. | 340/932.2 |

OTHER PUBLICATIONS

Fpga-Based Fuzzy Logic: Design and Applications—A Review IACSIT International Journal of Engineering and Technology vol. 1,No. 5,Dec. 2009 Nasri Sulaiman, Zeyad Assi Obaid, M. H. Marhaban and M. N. Hamidon Source: http://www.ijetch.org/papers/90New.pdf.

* cited by examiner

*Primary Examiner* — Thomas Tarcza
*Assistant Examiner* — Nagi Murshed
(74) *Attorney, Agent, or Firm* — Angela M Brunetti; Fredrick Owens

(57) ABSTRACT

A vehicle has a hybrid electric system and a parking assist system. The hybrid electric system includes at least one motor outputting a direction-indicating speed signal. The parking assist system configured for affecting steering and speed control of the vehicle for maneuvering the vehicle into a target parking location. Affecting the steering and speed control of the vehicle dependent upon parking assist control information derived using the direction-indicating speed signal.

6 Claims, 2 Drawing Sheets

DIRECTION DETERMINATION FOR ACTIVE PARK ASSIST

FIELD OF THE DISCLOSURE

The disclosures made herein relate generally to parking assist implementations in vehicles and, more particularly, to approaches for providing direction determination to support active parking assist functionality in a vehicle.

BACKGROUND

Parking a vehicle correctly can be a difficult challenge for certain drivers. In some instances, such parking requires maneuvering a vehicle to park it between two other vehicles that are parked in an end-to-end manner (e.g., cars that are parallel parked along a curb), which is commonly referred to as parallel parking. In other instances, such parking requires maneuvering a vehicle to park it between two other vehicles that are parked in a side-by-side manner (e.g., cars that are in a typical parking lot), which is commonly referred to as perpendicular parking. Factors that can contribute to and/or complicate such parking maneuvers include, but are not limited to, the size of the car being parked, the mobility of the vehicle being parked (e.g., turning radius), the spaces between the parked cars, a driver's inherent skill at performing such parking maneuvers, and the like.

Active park assist is a feature of a vehicle that assists a driver of the vehicle with or solely performs operations for maneuvering the vehicle into a parallel parking location or perpendicular parking location. Performing vehicle maneuvers for assisting with parallel parking and perpendicular parking of the vehicle requires a reliable and accurate source of information indicating a present direction that the vehicle is travelling. The direction indication information is important for accurately and reliably determining a position of the vehicle relative to a target parking space. However, it is known that use of gear position (e.g., as indicated by a transmission gear selector) is insufficient because the vehicle may be moving in a direction opposite to the gear position such as when the vehicle is in a reverse gear, but is rolling in the forward direction. Accordingly, with regard to active parking assist functionality, configuring a vehicle for allowing direction indication information to be determined in a manner that is robust yet cost effective is desirable.

SUMMARY OF THE DISCLOSURE

Performing vehicle maneuvers for assisting with parallel parking and perpendicular parking of the vehicle requires a reliable and accurate source of information indicating a present direction that the vehicle is travelling. Embodiments of the present invention are directed to providing such vehicle direction information for a hybrid electric vehicle (HEV) in a manner that is reliable, functionally effective, and cost efficient. Specifically, embodiments of the present invention are directed to acquiring such vehicle direction information from an existing output of a speed sensor on a motor shaft of a hybrid electric system (HES) of the HEV. In this manner, there is no need for a separate dedicated bi-directional wheel speed sensor at each wheel as is typically the case for fuel-only vehicles (e.g., vehicles powered solely by gasoline, diesel, of the like).

In one embodiment of the present invention, a vehicle comprises a powertrain system and a parking assist system. The electric powertrain system includes at least one system component outputting a direction-indicating speed signal. The direction-indicating speed signal information corresponds to a present direction in which the vehicle is moving and a present speed at which the vehicle is moving. The parking assist system is configured for affecting steering and speed control of the vehicle for maneuvering the vehicle into a target parking location. Affecting the steering and speed control of the vehicle is dependent upon parking assist control information derived using the direction-indicating speed signal.

In another embodiment of the present invention, a parking assist system for a vehicle comprises a signal interface and an information processing module. The signal interface is configured for receiving a direction-indicating speed signal from a hybrid electric system of the vehicle. The information processing module is configured for deriving parking assist control information using the direction-indicating speed signal.

In another embodiment of the present invention, a processor-readable medium having tangibly embodied thereon and accessible therefrom a set of instructions interpretable by at least one data processing device. The processor-readable medium is non-transient. The set of instructions is configured for causing the at least one data processing device to carry out operations for receiving a direction-indicating speed signal from a hybrid electric system of a vehicle and for deriving a parking assist control information using the direction-indicating speed signal.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
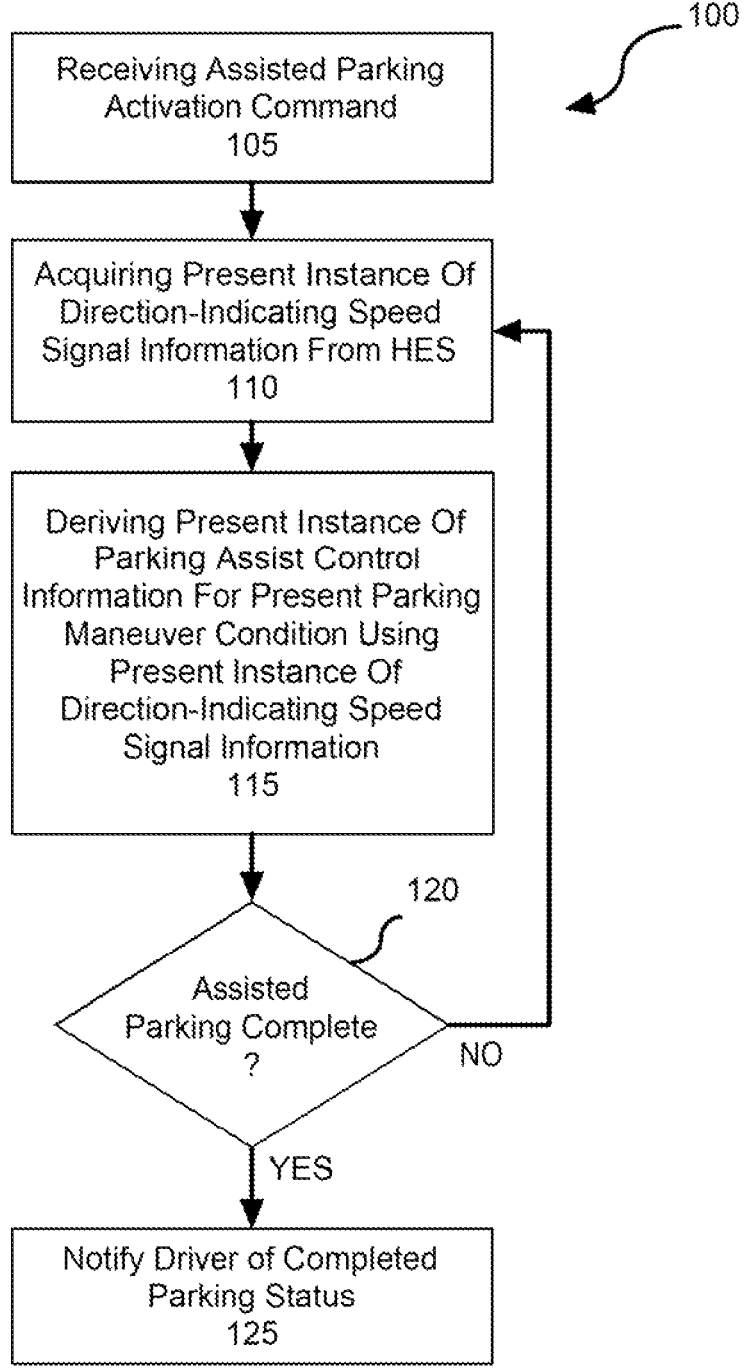
FIG. 1 is a flow chart view showing a method for enabling a hybrid electric vehicle to carry out active parking assist functionality in accordance with an embodiment of the present invention.
Figure 2:
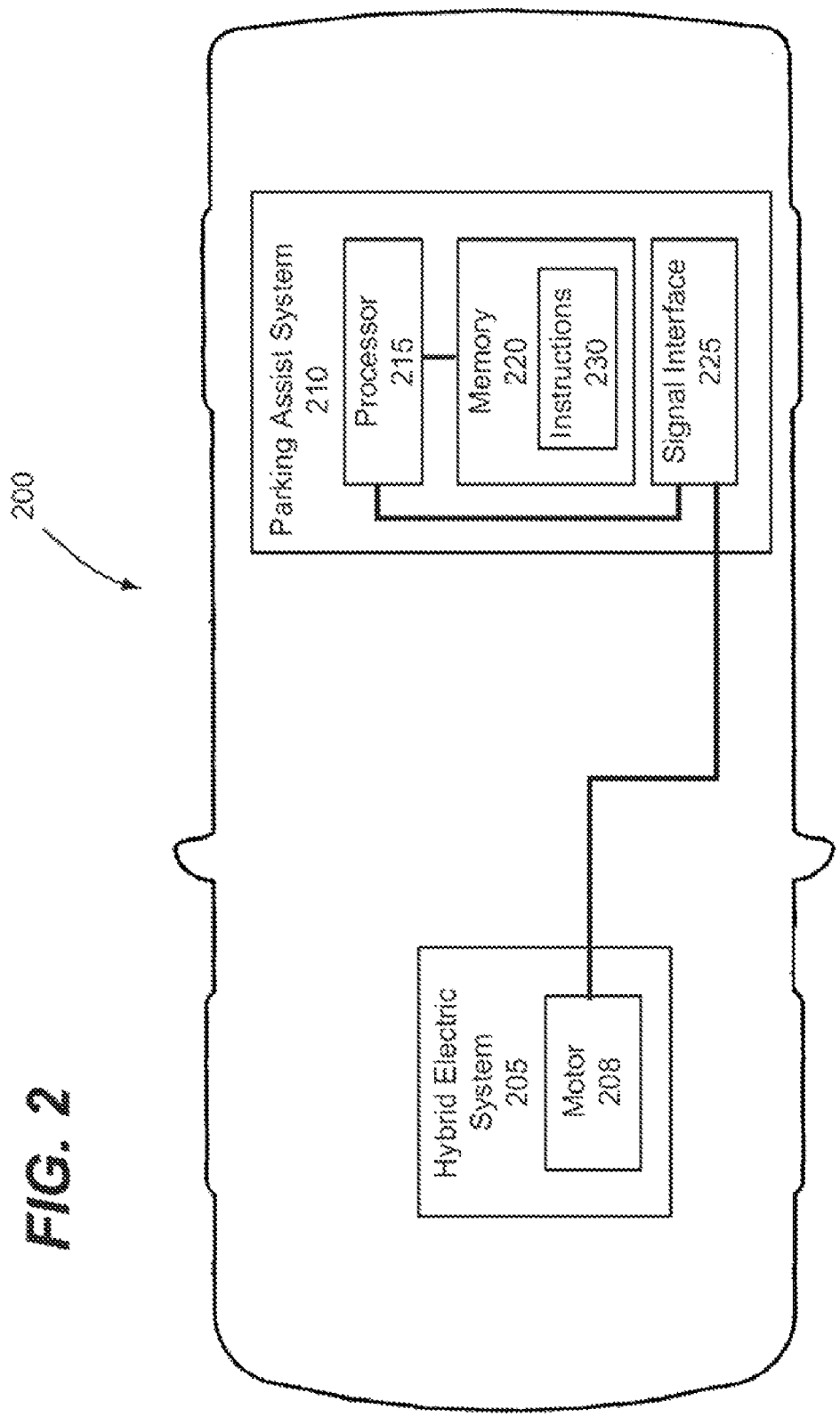
FIG. 2 is a block diagram view of a hybrid electric vehicle configured in accordance with an embodiment of the present invention is shown

FIGS. 1 and 2 show various aspects of implementing active parking assist functionality in accordance with embodiments of the present invention. Such embodiments utilize existing output signal information from a speed sensor on a motor shaft of a hybrid electric vehicle (HEV) for providing directional information of the HEV without the need for a sensor at each of its wheels. Advantageously, the output signal information from the sensor on the motor shaft can include a sign (i.e., speed signal sign) that designates a direction of travel of the vehicle. For example, a first sign (e.g., a positive sign (+)) designates forward direction and a second sign (e.g., a negative sign (−)) designates reverse direction. This sign and, optionally, speed information can be used as input information for the active parking system. In this manner, embodiments of the present invention provide for a more simplified, less expensive, and more efficient way to determine direction information for an active parking system of a HEV.

Referring now to FIG. 1, a method 100 for enabling a HEV to carry out active parking assist functionality in accordance with an embodiment of the present invention is shown. An operation 105 is performed for receiving an assisted parking activation command. It is disclosed herein that the assisted parking activation command can be issued in any number of ways. However, the typical manner in which such assisted parking activation command is issued is in response to a vehicle operator manually selecting activation of a vehicle's active parking assist function (e.g., pressing of a parking assist button, selecting a parking assist touch screen icon, etc).

In response to the assisted parking activation command being received, an operation 110 is performed for acquiring a present instance of direction-indicating speed signal information from a hybrid electric system (HES) motor(s) of the HEV. Such acquiring can include sampling of a direction-indicating speed signal outputted by the HES motor(s). It is disclosed herein that a typical HEV will have a single HES motor coupled to front drive wheels or rear drive wheels of the HEV. However, it is also disclosed herein that a HEV can have a first HES motor coupled to a first drive wheel and a second HES motor coupled to a second drive wheel. In this manner, the first and second HES motors of the HEV can drive different wheels thereof (e.g., drive motors at all wheels, separate drive motors for front drive wheels and rear drive wheels, and the like).

An operation 115 is performed for deriving a present instance of parking assist control information for a present parking maneuver condition of the HEV using the present instance of the direction-indicating speed signal information after acquiring the present instance of the direction-indicating speed signal information. The present parking maneuver condition can include any number of parameters related to controlling the vehicle for parking it in a target parking space. Examples of such parameters include, but are not limited to, present speed of the vehicle, present acceleration/deceleration of the vehicle, present relative angular orientation of the vehicle's steering system, present position of the vehicle relative to the target parking space, and the like. Correspondingly, examples of the derived parking assist control information include, but are not limited to, required speed of the vehicle, required acceleration/deceleration of the vehicle, required relative angular orientation of the vehicle's steering system, required position of the vehicle relative to adjacent vehicles, and the like. It is disclosed herein that, in the case where direction-indicating speed signal information is provided from a plurality of motors (e.g., each motor connected to a respective wheels), deriving the present instance of parking assist control information can include deriving such present instance of parking assist control information dependent upon a differential speed and/or acceleration between such motors.

After deriving the present instance of parking assist control information, an operation 120 is performed for determining if the vehicle has in fact been successfully parked in the target parking space (i.e., current instance of assisted parking is complete). If it is determined that the current instance of assisted parking is complete, an operation 125 is performed for notifying the driver that the vehicle has been successfully parked in the designed parking space and/or that the present instance of assisted parking is complete. If not, the method 100 returns to the operation 110 for acquiring a present instance (i.e., the next instance) of direction-indicating speed signal information from the HES motor(s) of the HEV.

Turning now to FIG. 2, a vehicle 200 configured in accordance with an embodiment of the present invention is shown. The vehicle 200 is a HEV that includes a hybrid electric system (HES) 205 and a parking assist system (PAS) 210. The HES 205 is electrically connected to the PAS 210 for allowing communication of information therebetween (e.g., one-way transmission of information, two-way transmission of information, etc).

The HES 205 includes a motor 208 configured for outputting direction-indicating speed signal information. Such direction-indicating speed signal information includes a signal jointly representing a relative or actual speed at which the motor is operating and a relative direction that the motor is turning (e.g., a direction corresponding to a forward or reverse direction of travel of the HEV). Furthermore, such direction-indicating speed signal information preferably provides real-time indication of whether the vehicle is moving in a forward direction or a reverse direction. It is disclosed herein that the HES 205 can include a plurality of such motors each configured for outputting respective direction-indicating speed signal information (e.g., for a respective wheel of the vehicle). It is disclosed herein that such direction-indicating speed signal information can be provided by (e.g., monitored and outputted) a speed sensor of the motor 208.

The PAS 210 includes a processor 215, memory 220, a signal interface 225, and instructions 230. The signal interface 225 is coupled between the processor 215 and the motor 208, thereby allowing direction-indicating speed signal information from the HES 205 to be provided to the PAS 210. The memory 220 is coupled to the processor 215 for allowing the instructions 230 to be accessed from the memory 220 by the processor 215. The memory 220 and instructions 230 jointly define an example of a non-transient processor-readable medium.

The instructions 230 are configured for carrying out parking assist functionality in accordance with embodiments of the present invention. To this end, the instructions 230 are configured for affecting steering and speed control of the HEV for maneuvering the HEV into a target parking location. Specifically, the instructions are configured for affecting the steering and speed control of the vehicle dependent upon parking assist control information derived using the direction-indicating speed signal information. In one embodiment, the instructions 230 are configured for carrying out the method 100 above for enabling a HEV to carry out active parking assist functionality.

In view of the disclosures made herein, a skilled person will appreciate that embodiments of the present invention are particularly well suited for a HEV. However, such skilled person will also appreciate that embodiments of the present invention can similarly be implemented in a fully electric vehicle (FEV) or any of other type of vehicle that that has a suitably configured system component (e.g., propulsion actuator or sensor) that can output a direction signal (e.g., a present direction in which the vehicle is moving and/or a present speed at which the vehicle is moving). Powertrain motors of a HEV (e.g., the motor 208 shown in FIG. 2) can be implemented in a similar manner in a FEV and, thus such a motor or motors are disclosed herein to be components of an electric powertrain system of the respective vehicle. As such, the method 100 discussed above in reference to FIG. 1 and the PAS 210 discussed above in reference to FIG. 2 can be implemented in a FEV In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle, comprising:
  an electric powertrain system including a first motor coupled to a first wheel of the vehicle and a second motor coupled to a second wheel of the vehicle, each one of said motors outputting a respective direction-indicating speed signal information that corresponds to a present direction in which the vehicle is moving and a present speed at which the vehicle is moving;
  said direction-indicating speed signal information includes a forward movement direction indicator for designating when the vehicle is traveling in a forward direction and a reverse movement direction indicator for designating when the vehicle is traveling in a reverse direction;
  a parking assist system configured for affecting steering and speed control of the vehicle for maneuvering the vehicle into a target parking location, wherein affecting the steering and speed control of the vehicle dependent upon parking assist control information derived using said forward and reverse direction-indicating speed signal information from at least one of said motors.

2. The vehicle of claim 1 wherein said direction-indicating speed signal information provides real-time indication of whether the vehicle is moving in a forward direction or a reverse direction.

3. A parking assist system for a vehicle, comprising:
  a signal interface for receiving respective direction-indicating speed signal information from a singular component that is part of a hybrid electric system of the vehicle, the singular component being one of a plurality of wheel-driving motors of the hybrid electric system;
  said direction-indicating speed signal information includes a forward movement direction indicator for designating when the vehicle is traveling in a forward direction and a reverse movement direction indicator for designating when the vehicle is traveling in a reverse direction; and
  an information processing module for deriving parking assist control information for forward and reverse movement using said direction-indicating speed signal information of at least one of said motors.

4. The system of claim 3 wherein said direction-indicating speed signal information provides real-time indication of whether the vehicle is moving in a forward direction or a reverse direction.

5. A processor-readable medium having tangibly embodied thereon and accessible therefrom a set of instructions interpretable by at least one data processing device, said processor-readable medium being non-transient, said set of instructions configured for causing said at least one data processing device to carry out operations for:
  receiving direction-indicating speed signal information from a singular component that is part of a hybrid electric system of a vehicle, the singular component being one of a plurality of wheel-driving motors of the hybrid electric system;
  said direction-indicating speed signal information includes a forward movement direction indicator for designating when the vehicle is traveling in a forward direction and a reverse movement direction indicator for designating when the vehicle is traveling in a reverse direction;
  deriving a parking assist control information using said forward and reverse direction-indicating speed signal information from at least one of said motors.

6. The processor-readable medium of claim 5 wherein said direction-indicating speed signal information provides real-time indication of whether the vehicle is moving in a forward direction or a reverse direction.

* * * * *